United States Patent [19]

Mallya et al.

[11] Patent Number: 5,625,005
[45] Date of Patent: Apr. 29, 1997

[54] ACRYLIC SATURATED RUBBER HYBRID PRESSURE-SENSITIVE ADHESIVES

[75] Inventors: Prakash Mallya, Pasadena; Colin C. Smith, Glendale, both of Calif.

[73] Assignee: Avery Dennison Corporation, Pasadena, Calif.

[21] Appl. No.: 548,255

[22] Filed: Oct. 25, 1995

Related U.S. Application Data

[63] Continuation of Ser. No. 89,260, Jul. 8, 1993, abandoned.

[51] Int. Cl.$^6$ .................... C08F 255/08; C08F 279/02
[52] U.S. Cl. .................... 525/301; 525/308; 525/309; 525/310
[58] Field of Search .................... 525/301, 308, 525/309, 310

[56] References Cited

U.S. PATENT DOCUMENTS

| | | | |
|---|---|---|---|
| 3,431,323 | 3/1969 | Jones | 260/880 |
| 3,786,116 | 1/1974 | Milkovich | 260/885 |
| 3,862,101 | 1/1975 | Milkovich et al. | 525/292 |
| 4,143,972 | 3/1979 | Benson | 366/25 |
| 4,243,500 | 1/1981 | Glennon | 204/159.12 |
| 4,418,120 | 11/1983 | Kealy et al. | 428/343 |
| 4,454,324 | 6/1984 | Madding | 546/337 |
| 4,551,388 | 11/1985 | Schlademan | 428/355 |
| 4,554,324 | 11/1985 | Husman et al. | 525/301 |
| 4,656,213 | 4/1987 | Schlademan | 524/272 |
| 4,693,935 | 9/1987 | Mazurek | 428/352 |
| 4,726,982 | 2/1988 | Traynor et al. | 428/213 |
| 4,732,808 | 3/1988 | Krampe et al. | 428/355 |
| 4,833,197 | 5/1989 | Schelhass et al. | 524/594 |
| 4,851,278 | 7/1989 | Enanoza | 428/195 |
| 4,988,742 | 1/1991 | Moon et al. | 522/79 |
| 5,006,582 | 4/1991 | Mancinelli | 524/271 |
| 5,024,880 | 6/1991 | Veasley et al. | 428/317.5 |
| 5,028,484 | 7/1991 | Martin et al. | 428/352 |
| 5,057,366 | 10/1991 | Husman et al. | 428/355 |
| 5,063,106 | 11/1991 | Nieuwenhuize et al. | 428/343 |
| 5,164,454 | 11/1992 | Suga | 525/309 |
| 5,252,395 | 10/1993 | Maruoka | 428/355 |
| 5,294,668 | 3/1994 | Babu | 525/80 |

FOREIGN PATENT DOCUMENTS

| | | |
|---|---|---|
| 303430 | 2/1989 | European Pat. Off. . |
| 352809 | 1/1990 | European Pat. Off. . |
| 439216 | 7/1991 | European Pat. Off. . |

OTHER PUBLICATIONS

"Encyclopedia of Polymer Science and Technology" (1967), vol. 7, pp. 563–564.

Modern Plastics–Encyclopedia '92, Mid–Oct. 1991, pp. 11–15, 38–39, 84–97, 381–382, 408–409, 417–420 and 424–425.

Polymer Handbook, Third Edition, Edited by J. Brandrup and E. H. Immergut, pp. VI/213, 226, 227 and 219.

"Handbook of PSA Technology," 2nd Ed. Editied by D. Satas, pp. 396–443.

"Polymer Handbook," 3rd Ed. Edited by J. Brandrup and H. Immergut, pp. 213, 226, 227, 219.

*Primary Examiner*—Irina S. Zemel
*Attorney, Agent, or Firm*—Christie, Parker & Hale, LLP

[57] ABSTRACT

There is provided a pressure-sensitive adhesive graft copolymer formed by reacting an acrylic monomer system comprising at least one alkyl acrylate ester containing from about 4 to about 8 carbon atoms in the alkyl group in the presence of a macromer selected from the group consisting of ethylene-butylene and ethylene-propylene macromers and mixtures thereof with each of said macromer having a molecular weight of from about 2,000 to about 30,000, a glass transition temperature of less than about 0° C. and a terminal reactive group of acrylate or methacrylate.

23 Claims, No Drawings

ACRYLIC SATURATED RUBBER HYBRID PRESSURE-SENSITIVE ADHESIVES

CROSS-REFERENCE TO RELATED APPLICATION

This is a continuation of application Ser. No. 08/089,260, filed Jul. 8, 1993 now abandoned.

FIELD OF THE INVENTION

This invention relates to graft pressure-sensitive adhesive copolymers that provide high room and elevated temperature shear performance, good UV resistance and aging characteristics along with high adhesion to non-polar surfaces.

BACKGROUND OF THE INVENTION

The use of macromers with pressure-sensitive adhesives (PSA) and for other applications are known. Macromers are relatively low molecular weight polymers having a functional reactive group at one or more terminals of the polymer.

U.S. Pat. No. 3,786,116 discloses an anionic polymerization technique used to make macromers of styrene, substituted styrenes, butadiene and isoprene. Graft copolymers of polyalphamethyl styrene and polystyrene with comonomers such as butylacrylate are exemplified. The role of the hard or high glass transition temperature (Tg) macromers is to improve the cohesive strength of the network through association of the hard segments. Synthesis of a graft copolymer of polypropylene with a polyisoprene macromer by coordination polymerization is also illustrated. The role of the polyisoprene is to modify the impact properties of the hard polypropylene. The use of low Tg macromers to improve the adhesion properties of a PSA to low energy surfaces is not taught or suggested.

U.S. Pat. No. 4,551,388 uses a hard poly(vinyl aromatic) macromer in an acrylic PSA composition. The role of the macromer is to provide cohesive strength to the network through the association of hard domains. U.S. Pat. No. 4,656,213 extends the '388 patent by using tackifiers and optionally a plasticizer for the acrylic phase.

U.S. Pat. No. 4,554,324 deals with a tacky PSA containing a macromer of Tg greater than 20° C. The role of this macromer in the PSA is to improve the cohesive strength through the high Tg macromer domains.

U.S. Pat. No. 4,693,935 pertains to combining polysiloxane macromers with acrylic comonomers to obtain a PSA with reduced initial adhesion to surfaces. The adhesives are repositionable adhesives.

U.S. Pat. No. 4,732,808 deals with an acrylic skin adhesive containing a high Tg macromer. The role of the macromer is to improve cohesive strength.

U.S. Pat. No. 4,833,179 discloses the use of a high Tg macromer as a modifier to increase the storage stability of suspension polymer microspheres.

U.S. Pat. No. 4,851,278 discloses acrylic polymers synthesized with high Tg macromers which are then used as binders to reduce the transfer of tacky microspheres. The improvement in cohesive strength comes from the hard polystyrene domains.

U.S. Pat. No. 5,006,582 discloses the use of hard macromers based on polymethyl methacrylate in combination with acrylic monomers and with a tackifier for the acrylic phase. The resulting polymer is stated to have high shear properties.

U.S. Pat. No. 5,057,366 disclosed a PSA coated sheet material using the compositions of U.S. Pat. No. 4,454,324.

None of the above patents, all of which are incorporated by reference, contemplate the use of a saturated, low Tg, low solubility parameter macromer that is present in another low Tg acrylic matrix.

Tackification of acrylics to improve adhesion to low energy surfaces such as polypropylene or polyethylene is also known in the art.

U.S. Pat. No. 4,418,120 discloses a crosslinked PSA containing a tackifying rosin ester to give good adhesion to polypropylene. The PSA is claimed to have good elevated temperature properties. However, due to the use of rosin ester tackifiers, the PSA would be expected to have poor resistance to UV and oxidative degradation leading to discoloration and loss of properties on aging.

U.S. Pat. No. 4,726,982 discloses a tackified PSA that has good adhesion to high solids paint systems. It is a crosslinked acrylic polymer made from an alkyl acrylate ester and N-vinyl-2-pyrrolidone. The tackifiers claimed are poly(isobornyl methacrylate), pentaerythritol ester of rosin and mixed aliphatic-aromatic tackifier resins.

EP 303430 discloses UV on-web polymerization of an acrylate ester to form a PSA in the presence of tackifiers. The tackifiers are aliphatic polymer resins with number average molecular weight of about 300 to 2500 and such that they allow polymerization of the acrylic monomers. Very high adhesion to polyolefins is shown with good shear properties.

U.S. Pat. No. 4,988,742 relates to UV on-web polymerization with an acrylate ester PSA in the presence of hydrogenated rosin ester tackifying agent. The adhesive with the tackifier are stated to have a lower glass transition temperature than the adhesive polymerized without the tackifier. High adhesion to polypropylene combined with high elevated temperature shear properties are disclosed.

U.S. Pat. No. 5,028,484 also relates to UV on-web polymerization of an alkyl acrylate polymerized in the presence of a tackifier to form a PSA. The tackifying resins is a poly tert-butylstyrene with solubility parameter of about 7 to 9.5 (cal/cc)$^{-1/2}$. This adhesive is claimed to lose not more than 70% of its adhesion when aged for a period of two weeks at 70° C.

All of the above patents, incorporated herein by reference, deal with tackification of the acrylic phase in order to improve the adhesion properties. A number of these patents necessitate the use of a UV on-web polymerization process in order to obtain compatibility of the tackifier with the acrylic polymer. Since some use rosin ester type tackifiers, they would be expected to have poor UV and oxidative stability. None teach or suggest the use of a low Tg, low polarity macromer phase and its tackification to get high adhesion to apolar surfaces.

A number of patents exist which disclose pressure-sensitive adhesives involving acrylic polymers and elastomers. Some claim improved adhesion to painted surfaces and low temperature performance.

U.S. Pat. No. 4,243,500 discloses a noncrystallizing elastomer dissolved in an acrylic monomer containing an initiator that responds to UV radiation to induce copolymerization. UV on-web polymerization is the essential element in this system.

EP Publications 349216 and 352901 both deal with a PSA tape comprising a phase separated UV polymerized PSA layer made from acrylic monomers in which is dissolved a hydrocarbon elastomer which has at least one unsaturated segment having a Tg lower than that of the acrylic. such PSA having improved adhesion to painted surfaces and low temperature performance. Because of the presence of an unsaturated segment, this pressure-sensitive adhesive would have poor UV and oxidative stability losing adhesive properties over time. Because of the need to have unsaturation in the elastomer in order to obtain crosslinking to achieve the phase separated network, saturated elastomers such as Kraton G polymers were shown to be not useful.

U.S. Pat. No. 5,024,880 deals with a cellular phase separated membrane containing a multiplicity of small voids, such as a membrane made from UV polymerizing an acrylate mixture containing a photoinitiator, a surfactant (0.1 to 5%) and a saturated hydrocarbon elastomer with at least one segment having Tg lower than that of the acrylate mixture. In the absence of the surfactant very large regions of the acrylic copolymer devoid of the elastomer are obtained. Even with the surfactant, the size of the domains are sufficiently large to scatter light and make the tape hazy. This technique is useful only using on-web polymerization as the morphology is formed in situ during polymerization of the acrylate monomers.

The above three patents involve using UV polymerization process to obtain a two phase network. UV is essential to achieve crosslinking between the acrylic and the unsaturation in the elastomer is required in order to obtain the two phase network.

U.S. Pat. No. 4,143,972 deals with a PSA wherein the acrylic polymer is synthesized with a high Tg(>20° C.) macromer such as polystyrene macromer. This polymer is then mixed with an elastomer such as a SEBS polymer. These are not chemically grafted but are purely physical blends that on drying are held in place through the association of the polystyrene domains of the acrylic and the elastomer. High Tg domains in each of the two polymers is necessary to keep the two mutually incompatible polymers from completely phase separating.

None of the above patents deal with or suggest the grafting of a low Tg saturated macromer of low solubility parameter onto an acrylic backbone by conventional free radical polymerization techniques.

SUMMARY OF THE INVENTION

The present invention is directed to comb type graft copolymers formed by polymerizing an alkyl ester monomer system in the presence of a macromer of ethylene-butylene or ethylene-propylene containing a reactive acrylate or methacrylate end group. The product is a comb type graft copolymer having acrylic backbone and pendant side chains of low glass transition temperature ethylene-butylene and/or ethylene-propylene macromer. The graft polymerization can be carried out using solution, suspension or emulsion polymerization techniques.

The acrylic backbone is formed of from 35% to 100% by total weight of the acrylate monomers of one or more alkyl acrylates containing from about 4 to about 8 carbon atoms in the alkyl group. The preferred alkyl acrylate is 2-ethyl hexyl acrylate, isomer isooctyl acrylate and butyl acrylate. It may be polymerized in the presence of a vinyl ester such as vinyl acetate, one or more diesters of a dicarboxylic acid present in the amount of up to about 35 percent by weight based on the total weight of the acrylate monomers, and unsaturated carboxylic acids containing from about 3 to about 5 carbon atoms present in the amount up to about 15 percent by weight of the acrylate monomers. The presently preferred acrylic backbone polymer is a copolymer of 2-ethyl hexyl acrylate present in the amount from about 95 to about 90 percent by weight and acrylic acid present in the amount of from about 5 to about 10 percent by weight.

The novel macromers employed for bonding to the acrylic backbone have a glass transition temperature of about 0° C. or less preferably about −20° to about −50° C. and are preferably present in an amount of from about 5 to about 50 percent by weight of the monomers forming the acrylic backbone and the macromer. The macromer may be modified with a saturated or substantially saturated tackifier, plasticizer or oil in which at least about 65 percent of the unsaturated groups are saturated, preferably by hydrogenation. Tackifier is normally present in the concentration ranging from about 45 percent to about 70 percent by weight based on the weight of the macromer and macromer modifying additive.

The preferred compositions are preferably crosslinked using a chemical crosslinking agent or actinic or electron beam radiation.

The pressure-sensitive adhesive graft copolymers of the instant invention are normally clear and provide outstanding adhesion to polypropylene combined with good room and elevated temperature properties and excellent aging.

DETAILED DESCRIPTION

The polymers of the present invention are made by copolymerizing an acrylate ester monomer system in the presence of a macromer of ethylene-butylene (EB) or ethylene-propylene (EP) containing a reactive acrylate or methacrylate end group. This leads to a comb type graft copolymer having acrylic backbone and sidechains of the low Tg EB or EP macromer. In solution, the graft copolymers are synthesized by conventional free radical techniques using a mixture of heptane and ethyl acetate as the solvent. The monomer mixture could be all acrylate esters or include polar comonomers such as vinyl pyrrolidone and/or acrylic acid. Other comonomers such as vinyl acetate, dioctyl fumarate or maleate, styrene and the like can be used to further modify the Tg and other properties of the acrylic based backbone. Such a graft copolymer when cast as a film, exhibits two phase morphology as will be demonstrated by solubility characteristics in selected solvents. The domains are sufficiently small so that they do not scatter light thus giving clear films.

The acrylic backbone is believed to be the continuous load bearing phase with the EB or EP domains as the discontinuous phase. The EB or EP domains can be further modified using substantially to fully hydrogenated tackifiers, plasticizers and/or oils. The copolymer can be crosslinked using the functional groups in the acrylic matrix i.e. ionic or other means of crosslinking such as with isocyanates and the like. Alternately, UV or electron beam energy can be used to post crosslink the PSA graft copolymer. The untackified and tackified graft copolymer has outstanding adhesion to polypropylene combined with good room and elevated shear properties and excellent aging.

The molecular weight of the macromer can range from about 2,000 to about 30,000. Any tackifier that is compatible with the macromer could be used to tackify the macromer phase. If the tackifiers or the macromer in the graft copolymer contain any residual unsaturation, the system could be stabilized against UV and oxidative degradation by using UV stabilizers and antioxidants. If desired, the acrylic phase could also be tackified.

Graft polymerization can be carried out by solution, suspension or emulsion polymerization techniques. If necessary, it can also be carried out by polymerization of the monomers and the macromer in the presence of a photoinitiator by exposing the mixture to UV radiation (on web polymerization). For solution polymerization process, it is desirable that the macromer be fully or very highly saturated. Otherwise, unsaturation will lead to premature crosslinking during polymerization. From a UV and oxidative stability point of view, saturated macromers are preferred. However, emulsion and on-web polymerization processes can tolerate unsaturation.

As stated above, the present invention is based on pressure-sensitive adhesives (PSA) of a comb-type graft copolymers containing a low glass transition temperature (Tg) PSA acrylic backbone having grafted thereto a low glass transition temperature ethylene-butylene (EB) or ethylene-propylene (EP) macromer where the grafting reaction occurs at an acrylate or methacrylate group on the macromer. The EB or EP phase provides for high adhesion to apolar surfaces such as polypropylene, and can be tackified to enhance adhesion. The glass transition temperature (Tg) of the macromer is less than about 0° C. preferably from about −20° C. to about −50° C.

More particularly, the polymers of the instant invention are made by copolymerizing acrylate ester-containing monomers to form a polymer of low glass transition temperature, i.e., −10° C. or less in the presence of a macromer of ethylene-butylene (EB) or ethylene-propylene (EP) also of a low glass transition temperature, i.e., −20° C. or less containing a polymerizable end group such as an acrylate or methacrylate. This leads to the formation of a comb-type graft copolymer having an acrylic-based backbone with side chains of a low glass transition temperature (Tg) EB or EP polymers. Glass transition temperature is determined by a differential scanning calorimeter (DSC).

Graft polymers are preferably synthesized by free radical polymerization techniques in solution normally using a mixture of heptane and ethyl acetate.

The acrylic monomer system used to make the acrylic background could be solely based on acrylate ester monomers, but may also be modified by inclusion of polar monomers.

The acrylic based backbone polymers are formed in the presence of the reactive hydrogenated macromer provided in a weight of about 5 to about 50 preferably 10 to 30 more preferably 15 to 25 percent by weight of the monomers forming the acrylic backbone and the macromer. By polymerizing the acrylic monomers in the presence of the reactive macromer, the reactive macromer grafts to the formed or forming acrylic polymer backbone and forms small domains which do not scatter light and are clear. Adhesion to apolar surfaces is excellent as is room and elevated temperature shear. Adhesion to polar surfaces, such as stainless steel, is also excellent, providing an adhesive with broad-based utility.

As indicated, the macromer portion of the graft copolymer may be tackified using substantially fully saturated tackifiers.

The acrylic polymers that are used to form the backbone of the instant invention are preferably acrylic ester/acrylic acid copolymers, but may be formed from a variety of other monomers.

The acrylic-based backbone polymers to which the EB or EP macromer is grafted may contain, on a percent-by-weight basis, from about 35 to about 100 percent by weight of the total acrylate backbone of one or more alkyl acrylate esters containing about 4 to about 8 carbon atoms in the alkyl group. Useful alkyl acrylate esters include n-butyl acrylate, 2-ethyl hexyl acrylate, isooctyl acrylate, and the like, with 2-ethyl hexyl acrylate being preferred.

A modifying monomeric component which may be present includes one or more vinyl esters which may be present in a total amount of up to about 35 percent by weight, based on total weight of the monomers forming the acrylate polymer backbone. Representatives of the vinyl esters include vinyl acetate, vinyl butyrate, vinyl propionate, vinyl isobutyrate, vinyl valerate, vinyl versitate, and the like. Vinyl acetate is preferred.

Another modifying component of the acrylic backbone polymer is one or more diesters of a dicarboxylic acid and mixtures thereof, present in a total amount of up to about 35 percent by weight based on the total weight of the monomers. Each ester group of the diester of the dicarboxylic acid independently contains from about 8 to about 16, preferably from about 8 to about 12, carbon atoms. The preferred diesters are di-2-ethyl hexyl maleate, di-3-ethyl hexyl fumarate and mixtures thereof.

Another modifying component and preferably used monomer is one or more unsaturated carboxylic acids containing from about 3 to about 5 carbon atoms and present in a total amount of up to about 10 percent by weight of the polymer, preferably from 5 to about 10 percent by weight. The unsaturated carboxylic acids includes, among others, acrylic acid, methacrylic acid, itaconic acid, and the like. Acrylic acid, methacrylic acid and, more preferably, mixtures thereof are presently preferred.

Other comonomers such as methyl acrylate, methyl methacrylate, styrene and the like could be used to modify the Tg of the acrylic copolymer. Polar comonomers such as N-vinyl pyrrolidone, N-vinyl caprolactam, hydroxyethyl (propyl) (meth)acrylate, acetoacetoxyethyl methacrylate, etc. could be used to further enhance adhesion to various surfaces. Other comonomers such as glycidyl methacrylate or allyl glycidyl ether could be used to further enhance high temperature shear properties. Presently preferred acrylic backbone polymers are copolymers of 2-ethyl hexyl acrylate present in an amount of from about 95 percent to about 90 percent by weight, and acrylic acid present in an amount of from about 5 to about 10 percent by weight.

The monomer proportions of the acrylic polymer are adjusted in such a way that the backbone polymer has a glass transition temperature of less than about −10° C., preferably from about −20° C. to about −60° C., giving a good balance of adhesion and tack at room temperature and low temperatures.

The macromer modifying tackifier, plasticizer and/or oils are substantially nonresponsive to free radicals, such as hydrogenated aliphatic resins derived from petroleum-based products, highly hydrogenated rosins and rosin esters, hydrogenated white oil, mineral oil and the like. As specific tackifiers employed in the practice of the invention, there may be mentioned: hydrogenated styrene-based resins such as Regalrez™, resins designated as 1018, 1033, 1065, 1078, 1094 and 1126 manufactured and sold by Hercules, Inc.; Regalrez™ 6108, a 60% hydrogenated aromatic resin also manufactured by Hercules; hydrogenated $C_5$ and/or $C_9$ hydrocarbon resin feed stocks such as Arkon™ P-70, P-90, P-100, P-115, M-90, M-100, M-110 and M-120 resins manufactured and sold by Arakawa Chemical and Regalite™ R-100, MGB-63, MGB-67, MGB-70 resins manufactured and sold by Hercules, Inc.; hydrogenated polycyclo-pentadienes such as Escorez™ 5320, 5300 and 5380 resins manufactured and sold by Exxon Chemical;

hydrogenated polyterpene and other naturally occurring resins such as Clearon™ P-105, P-115, P-125, M-105, M-115 manufactured and sold by Yasuhara Yushi Kogyo Co. Ltd. of Japan and Eastotack™ H-100, H-115 and H-130 resins manufactured and sold by Eastman Chemical and the like; Kaydol™ hydrogenated mineral oil manufactured and sold by Witco Chemical and the like.

To be generally useful, aliphatic hydrocarbon tackifiers, plasticizers, or oils must have at least 65 percent, preferably 80 percent of unsaturated groups in the product as formed should be saturated with saturation typically achieved by hydrogenation.

The macromer modifiers which serve a tackifying function increase Tg while plasticizers and oils lower Tg. The macromer modifiers are normally present in a concentration ranging from about 45 percent to about 70 percent by weight, preferably from about 60 percent to about 70 percent by weight of the mixture of macromer and macromer modifier additive.

In the following Examples and Controls the following test procedures were employed.

180° Peel

Samples of the adhesive either directly coated on mylar or laminated to mylar from the release liner were cut in 2.54 cm by about 20 cm test strips. They were rolled down on stainless steel or polypropylene test panels with a 2 kg rubber clad steel roller moving back and forth at a rate of about 30 cm/min. After a dwell time of 20 minutes or 24 hours, the test strips were peeled away from the test panel in an Instron Tensile Tester at 180° to the test panel, i.e., folded back on itself and parallel to the surface of the panel, at a rate of about 30 cm/min. The force to remove the adhesive strip from the test panel was measured in Newtons per meter (M/M). Tests were performed in triplicate.

Shear

Samples of the adhesive coated on release liner were laminated to 2 mil mylar or soft aluminum facestock. A strip of tape was adhered by its adhesive to a SS panel using a 2 kg rubber clad steel roller with a free end of the tape extending beyond the plate and the adhesive contact area being either 1.27 cm×1.27 cm or 1.27×2.54 cm or 2.54 cm×2.54 cm. After appropriate dwell time, i.e., zero dwell for initial room temperature (RT) shear and 24 hr dwell at RT, followed by dwell for 30 minutes at 70° C. for 70° C. shear, the plate was placed at an angle of 2° from the vertical and a load is suspended from the free end. For RT shear, a 500 g or 1,000 g load was used, for 70° C. shear a 1,000 g load was used.

Percent Insolubles

This test determines the portion of the polymer that is insoluble in the solvent used to dissolve it. The test consists of weighing out a small amount of the adhesive, say 75 mg., placing it in a 10 micrometer polytetrafluoroethylene membrane filter. The edges of the filter was sealed to contain the sample and the filter is placed in a vial containing the solvent. The vial was tumbled for 48 hours, the filter taken out of the solvent, dried at elevated temperature under vacuum. The filter was weighed and the resulting weight of the sample was used to calculate the percent insoluble as follows:

% insoluble=initial weight of the sample×100/final weight of the sample

Without being limiting the following are to illustrate the invention:

EXAMPLE 1

Synthesis of the EB macromer

A fully hydrogenated ethylene-butylene copolymer formed from hydrogenation of 1,4 and 1,2 polybutadiene and having a molecular weight of 13300 and a terminal hydroxyl group was synthesized and provided as a dispersion in cyclohexane. This was rotary evaporated at 40° C. under vacuum to remove cyclohexane and was dried in an oven under vacuum overnight at room temperature. The dry EB polymer (111.7 g) was dissolved in 300 ml. anhydrous tetrahydrofuran (distilled over Na/benzophenone) in a dry argon atmosphere. To this was added 1.87 g of isocyantoethyl methacrylate and 0.187 g of dibutyl tin dilaurate catalyst. The solution was stirred for 48 hours and was precipitated with a large excess of methanol. This was rotary evaporated under vacuum at 40° C. The Tg of the macromer was determined to be −61° C. by DSC.

EXAMPLE 2

15% EB graft copolymer

To 9 g of the EB macromer of Example 1 (amounting to 15% of total polymer including EB macromer and acrylic monomers), there was added 30 g of heptane to form a solution. The remaining 85% was formed of a mixture of 47.15 g (92 ppha[1]) 2-ethylhexyl acrylate (2-EHA); 4.1 g (8 ppha) of acrylic acid (AA) 0.04 of Vazo 64 initiator and 30 g of ethyl acetate. This solution, in a bottle, was purged with nitrogen for 10 minutes and immersed in an oil bath maintained at 62° C. for 16 hours. There was formed a graft copolymer which was vacuum dried.

[1] ppha=parts per hundred parts acrylic

The dried graft copolymer was subjected to leaching in butanol which is a good solvent for the acrylic polymer but a nonsolvent for the EB polymer. After 48 hours leaching, insoluble fraction in butanol was found to be about 74.7%. This indicates that significant portion of the acrylic polymer has EB grafted to it and the EB domains prevent the acrylic polymer from dissolving in butanol. The adhesive before coating was crosslinked with aluminum acetyl acetonate (AAA) at 0.2 parts AAA per hundred parts of acrylic polymer. The adhesive film was clear.

EXAMPLE 3

25% EB graft copolymer

The procedure of Example 2 was followed with the following parts by weight of EB macromer, 2-EHA and AA respectively: 15 (25% of total polymer), 41.4 2-EHA (92 ppha) and 3.6 (8 ppha). After butanol leaching, insoluble portion fraction was 78.4% indicating significant grafting. The adhesive before coating was crosslinked between 0.2 or 0.3 parts AAA per hundred parts of acrylic polymer. The adhesive film was clear.

EXAMPLE 4

Tackification of 15% EB copolymer

To 50 g of the graft copolymer of Example 2 in solution at 18.78% solids (9.39 g solids, 15% EB or 1.4 g), there was added 1.41 g of Regalrez 1094 and 0.705 g of Regalrez 1018. This translates to EB to tackifier ratio of 40 to 60. To this solution there was added a 40% aluminum acetyl acetonate (AAA) solution to a level 0.2 parts AAA per hundred acrylic polymer. This solution was either coated on a release liner (coated with a silicone polymer) or directly coated on mylar. The coat weights used are listed in the Table. The adhesive film was clear to very slightly translucent.

EXAMPLE 5

Tackification of 25% EB copolymer

To 50 g of the graft copolymer of Example 3 (25% EB containing graft copolymer) solution at 21.37% solids (Total polymer 10.68 g, EB content, 2.67 g), there was added 2.67 g of Regalrez 1094 and 1.33 g of Regalrez 1018. EB to tackifier ratio was 40 to 60. To this, there was added 0.16 g AAA solution (0.2 ppha) and coated as in Example 4. The adhesive film was clear to very slightly translucent.

EXAMPLE 6

Tackification of 25% EB copolymer

Example 5 was repeated but at a level of Regalrez 1094 and Regalrez 1018 to obtain a EB polymer to tackifier ratio of 30 to 70. This was crosslinked with AAA at level of 0.2 and 0.3 ppha and coated as in Example 4. The adhesive film was clear to very slightly translucent.

EXAMPLE 7

Heat Aging

The product of Example 6 at 0.3 AAA at a coat weight of 136 g/m$^2$ on Mylar was heat aged in an oven for two weeks at 70° C. It was removed and allowed to cool to ambient temperature and laminated to polypropylene. It was peel tested after 24 hours dwell. Peel was the same as the unaged sample.

Control 1 Acrylic polymer without grafting EB macromer

A control polymer was synthesized using 46 g (92 ppha) of 2-EHA and 4 g (8 ppha) of AA, 0.075 g Vazo 64 in 50 g ethyl acetate using the same procedure as in Example 2 and was coated as in Example 4.

Control 2 Physical Blend of acrylic polymer and EB macromer

To the polymer from Control 1 there was added 25% of the EB macromer from Example 1. A film of the physical blend was very hazy indicating incompatibility.

Control 3

To the blend of Control 2, there was added the tackifiers, Regalrez 1094 and 1018 to obtain a ratio of 40:60 of EB to tackifiers. A film of this was very white indicating gross incompatibilities of the tackifiers with the mixture EB macromers and acrylic polymer.

The results of the testing of the copolymers is shown in the Table. The results very clearly show that high peel adhesions can be attained on apolar polypropylene surface using the tackified acrylic/EB graft copolymer system. The results also show that such a system has good room temperature and 70° C. shear properties.

Control 4

The acrylic macromer system of Control 1 was reacted in the presence of an ethylene-butylene macromer having a terminal hydroxyl group. A hazy solution polymer was formed indicating a gross incompatibility between the acrylic polymer and macromer.

EXAMPLE 8

Synthesis of EP Macromer

A high cis 1,4, polyisoprene having a molecular weight of about 12000 and a terminal hydroxyl group is fully hydrogenated to give an ethylene propylene copolymer. About 112 g of this copolymer is dissolved in anhydrous tetrahydrofuran (300 ml) in a dry argon atmosphere. To this is added isocyanatoethyl methacrylate (1.9 g) and dibutyl dilaurate catalyst (0.19 g). The solution is stirred for 48 hours and precipitated with a large excess of methanol and dried to recover the macromer.

For the above Examples the extent of reaction of the hydroxyl terminated EB polymer with isocyanatoethyl methacrylate to form the methacrylate terminated macromer was determined by GPC using a UV detector. Isocyanatoethyl methacrylate was used for calibration. The conversions were seen to be above 80%.

TABLE

| | Tackfier pph polymer | X-linker AAA ppha | Coat Wt. gsm | 180° Peel, PP N/M 20 'Dwell | 180° Peel, PP N/M 24 Hr. | 180° Peel, SS N/M | Shear Min. .25 sq" 500 g | Shear Min. .25" sq" 1 kg | Shear Min. 1 sq", 1 kg | 1 sq", 1 kg, 70° C. |
|---|---|---|---|---|---|---|---|---|---|---|
| Example 3 | 0 | 0.2 | 40 | 405 | 420 | 681 | 15340 + | 280 880 | | |
| Example 5 | 37.5 | 0.2 | 38 | 550 | 710 | 911 | 3607 | 235 | | |
| Example 6 | 58.3 | 0.2 | 30 | 630 | 1000 | | 796 | 104 | | |
| Example 6 | 58.3 | 0.3 | 136 | | 2046 | | 1,767 | 126 | 50,000 | 1500 |
| Control 1 | 0 | 0.2 | 120 | | 400 | | | | | |
| Example 3 | 0 | 0.3 | 148 | | 440 | | | | | |
| Control 1 | 0 | 0.2 | 30 | 259 | 330 | | 1470 | 280 | | |
| Control 2 | 0 | 0.2 | 34 | 645 | 570 | | | 86 | | |
| Example 2 | 0 | 0.2 | 42 | 382 | 375 | | | 489 | | |
| Example 4 | 37.5 | 0.2 | 30 | 387 | 383 | | | 340 | | |

PP — polypropylene
SS — stainless steel
gsm — grams per sq. meter

What is claimed is:

1. A pressure-sensitive adhesive graft copolymer formed by reacting an acrylic monomer system comprising at least one alkyl acrylate ester containing from about 4 to about 8 carbon atoms in the alkyl group in the presence of a macromer selected from the group consisting of ethylene-butylene and ethylene-propylene macromers and mixtures thereof, each of said macromers having a molecular weight of from about 2,000 to about 30,000, a glass transition temperature of less than about 0° C. and a terminal reactive group selected from the group consisting of acrylate and methacrylate.

2. A graft copolymer as claimed in claim 1 in which the macromer has a glass transition temperature of from about −20° to about −50° C.

3. A graft copolymer as claimed in claim 1 in which the acrylic monomer system comprises from about 95 to about 90 percent by weight 2-ethyl hexyl acrylate and from about 5 to about 10 percent by weight acrylic acid.

4. A graft copolymer as claimed in claim 2 in which the acrylic monomer system comprises from about 95 to about 90 percent by weight 2-ethyl hexyl acrylate and from about 5 to about 10 percent by weight acrylic acid.

5. A graft copolymer as claimed in claim 1 in which the macromer is present in an amount of from 5 to about 50 percent by weight of the acrylic monomer system and macromer.

6. A graft copolymer as claimed in claim 4 in which the macromer is present in an amount of from 5 to about 50 percent by weight of the acrylic monomer system and macromer.

7. A graft copolymer as claimed in claim 1 in which the macromer is present in an amount of from 10 to about 30 percent by weight of the acrylic monomer system and macromer.

8. A graft copolymer as claimed in claim 4 in which the macromer is present in an amount of from 10 to about 30 percent by weight of the acrylic monomer system and macromer.

9. A graft copolymer as claimed in claim 1 in which the macromer is present in an amount of from 15 to about 25 percent by weight of the acrylic monomer system and macromer.

10. A graft copolymer as claimed in claim 4 in which the macromer is present in an amount of from 15 to about 25 percent by weight of the acrylic monomer system and macromer.

11. A graft copolymer as claimed in claim 1 in which there is present a modifier selected from the group consisting of tackifiers, plasticizers, oils and mixtures thereof, said modifier being substantially nonresponsive to the action of free radicals.

12. A graft copolymer as claimed in claim 4 in which there is present a modifier selected from the group consisting of tackifiers, plasticizers, oils and mixtures thereof, said modifier being substantially nonresponsive to the action of free radicals.

13. A graft copolymer as claimed in claim 7 in which there is present a modifier selected from the group consisting of tackifiers, plasticizers, oils and mixtures thereof, said modifier being substantially nonresponsive to the action of free radicals.

14. A graft copolymer as claimed in claim 10 in which there is present a modifier selected from the group consisting of tackifiers, plasticizers, oils and mixtures thereof, said modifier being substantially nonresponsive to the action of free radicals.

15. A graft copolymer as claimed in claim 11 in which the modifier is present in an amount of from about 45 percent to about 70 percent by weight based on the weight of the macromer modifying additive.

16. A graft copolymer as claimed in claim 12 in which the modifier is present in an amount of from about 45 percent to about 70 percent by weight based on the weight of the macromer modifying additive.

17. A graft copolymer as claimed in claim 1 in which the graft polymer is crosslinked.

18. A graft copolymer as claimed in claim 4 in which the graft polymer is crosslinked.

19. A graft copolymer as claimed in claim 12 in which the graft polymer is crosslinked.

20. A graft copolymer as claimed in claim 17 in which the graft copolymer is crosslinked using aluminum acetyl acetonate as the crosslinking agent.

21. A graft copolymer as claimed in claim 18 in which the graft copolymer is crosslinked using aluminum acetyl acetonate as the crosslinking agent.

22. A graft copolymer as claimed in claim 20 in which the crosslinking agent is present in an amount of about 0.2 to about 0.3 percent by weight of the polymer.

23. A graft copolymer as claimed in claim 21 in which the crosslinking agent is present in an amount of about 0.2 to about 0.3 percent by weight of the polymer.

* * * * *